(12) United States Patent
Florek et al.

(10) Patent No.: US 12,446,933 B2
(45) Date of Patent: Oct. 21, 2025

(54) ULTRATHIN FILMS FOR TRICLOSAN TRANSFER TO METAL MEDICAL DEVICES

(71) Applicant: DePuy Synthes Products, Inc., Raynham, MA (US)

(72) Inventors: Charles Florek, Downingtown, PA (US); David A. Armbruster, West Chester, PA (US)

(73) Assignee: DePuy Synthes Products, Inc., Raynham, MA (US)

( * ) Notice: Subject to any disclaimer, the term of this patent is extended or adjusted under 35 U.S.C. 154(b) by 450 days.

(21) Appl. No.: 17/664,676

(22) Filed: May 24, 2022

(65) Prior Publication Data
US 2022/0370692 A1    Nov. 24, 2022

Related U.S. Application Data

(60) Provisional application No. 63/192,339, filed on May 24, 2021.

(51) Int. Cl.
*A61B 17/80*    (2006.01)
*A61K 31/09*    (2006.01)
(Continued)

(52) U.S. Cl.
CPC .......... *A61B 17/8052* (2013.01); *A61K 31/09* (2013.01); *A61L 27/54* (2013.01); *A61L 31/022* (2013.01); *A61L 31/10* (2013.01); *A61L 31/148* (2013.01); *A61L 31/16* (2013.01); *B05D 1/18* (2013.01); *A61L 2300/202* (2013.01); *A61L 2300/216* (2013.01); *A61L 2300/404* (2013.01);
(Continued)

(58) Field of Classification Search
CPC . A61B 17/80; A61B 17/8052; A61B 17/8057; A61B 17/8085; A61B 17/84; A61B 17/86; A61B 17/866; A61L 27/54; A61L 31/148; A61L 31/16; A61L 2300/202; A61L 2300/216; A61L 2300/404; A61L 2420/02; A61L 2420/06; B05D 1/18
See application file for complete search history.

(56) References Cited

U.S. PATENT DOCUMENTS 7,513,093 B2 *   4/2009   Scalzo ............. A61B 17/06114
                                                         53/425
8,112,973 B2     2/2012   Fischer et al.
(Continued)

FOREIGN PATENT DOCUMENTS

WO      2004/032703 A2    4/2004

OTHER PUBLICATIONS

Eman S. Zarie et al: Solvent Free Fabrication of Micro and Nanostructured Drug Coatings by Thermal Evaporation for Controlled Release and Increased Effects, FLOS One, vol. 7, No. 8, Aug. 1, 2012 (Aug. 1, 2012), p. e40746, XP055545130, DOI: 10.1371/journal.pone.0040746.

*Primary Examiner* — Larry E Waggle, Jr.
(74) *Attorney, Agent, or Firm* — BakerHostetler

(57) ABSTRACT

Provided are orthopedic implants and systems and kits containing orthopedic implants that include biodegradable polymer thin films containing an antimicrobial agent, wherein the implants produce an effective zone of inhibition around a periphery of the surface of the implant and do not produce a loss of release torque between interlocking implant components.

19 Claims, 5 Drawing Sheets

(51) Int. Cl.
  *A61L 27/54*  (2006.01)
  *A61L 31/02*  (2006.01)
  *A61L 31/10*  (2006.01)
  *A61L 31/14*  (2006.01)
  *A61L 31/16*  (2006.01)
  *B05D 1/18*   (2006.01)
(52) U.S. Cl.
  CPC ....... *A61L 2420/02* (2013.01); *A61L 2420/06* (2013.01)

(56) References Cited

U.S. PATENT DOCUMENTS

| | | | |
|---|---|---|---|
| 8,133,437 | B2 | 3/2012 | Scalzo et al. |
| 8,156,718 | B2 | 4/2012 | Scalzo et al. |
| 8,668,867 | B2 | 3/2014 | Scalzo et al. |
| 8,960,422 | B2 * | 2/2015 | Reyhan ................ A61L 17/005 206/63.3 |
| 9,011,965 | B2 * | 4/2015 | Gan ....................... A61P 19/00 427/2.27 |
| 9,044,531 | B2 | 6/2015 | Dave et al. |
| 9,149,273 | B2 | 10/2015 | Scalzo et al. |
| 9,474,524 | B2 | 10/2016 | Fischer et al. |
| 9,597,067 | B2 | 3/2017 | Reyhan et al. |
| 9,597,072 | B2 | 3/2017 | Scalzo et al. |
| 2010/0082064 | A1 * | 4/2010 | Chun ..................... A61L 27/04 606/246 |
| 2010/0266657 | A1 * | 10/2010 | Xia ........................ A61K 47/34 514/777 |
| 2010/0331880 | A1 * | 12/2010 | Stopek ............... A61B 17/0644 523/118 |
| 2011/0098724 | A1 * | 4/2011 | Cichocki ............. A61L 17/005 424/404 |
| 2012/0029638 | A1 * | 2/2012 | Miller ...................... A61F 2/44 623/17.11 |
| 2013/0216599 | A1 | 8/2013 | Kumar et al. |
| 2019/0046688 | A1 * | 2/2019 | Miller ..................... A61L 27/46 |

\* cited by examiner

Untreated Pin    60°C PCL tumbled Pin (Images were obtained at 100x magnification)

60°C PCL tumbled 4-hole LCP trauma plate

Before                     After

Microscopy at 100x on Keyence:

Untreated "Flat Plate"     56°C PCL tumbled "Flat Plate"

Bacterial colonization testing

Adherence from 1 hour agitated inoculation
Proliferation of adherent bacteria in an otherwise sterile environment

* Inoculum increased with serum to maintain $10^2$-$10^3$ CFU/pin attachment

ULTRATHIN FILMS FOR TRICLOSAN TRANSFER TO METAL MEDICAL DEVICES

CROSS REFERENCE TO RELATED APPLICATIONS

This application claims the benefit of priority to U.S. Provisional Application No. 63/192,339, filed May 24, 2021, the entire contents of which are hereby incorporated by reference.

TECHNICAL FIELD

The present disclosure pertains to orthopedic implants with antimicrobial properties.

BACKGROUND

Many individuals receive orthopedic surgical implants every year as a result of orthopedic trauma or joint replacement procedures. In the United States, over 600,000 artificial knee prostheses and over 300,000 artificial hip prostheses are implanted every year according to the American Academy of Orthopedic Surgeons. More than one million patients each year receive metal implants for treatment of broken bones. Implant related infection is one of the most severe potential complications related to orthopedic implants, with infection rates of over 10% in some high-risk procedures and patient groups. The cost of treating implant related infection is significant, because treatment often requires surgical removal of the infected implant and extended treatment with antibiotics.

Implant related infections are caused when bacteria contaminate a surgical wound site, attach to the surgical implant, and begin to proliferate. Bacteria growing on an implant surface often form a biofilm, in which they secrete a protective extracellular matrix and their metabolic activity is significantly reduced. This biofilm phenotype protects the bacteria from the patient's immune system and from systemic antibiotics, which makes treatment of implant related infection very difficult and costly.

One solution to preventing implant related infection is to treat the surface of the surgical implant in a way that prevents bacterial growth and attachment. Surgical implants have been developed that are coated with antibiotics or antimicrobial compounds to kill bacteria in the surgical wound site or on the implant surface before they can attach and proliferate on the implant. Examples include antimicrobial coated pacemaker pouches (TYRX™ Absorbable Antimicrobial Envelope), orthopedic implants (ETN PROtect), surgical graft materials (XenMatrix™ AB Surgical Graft), and sutures (VICRYL® Plus Antimicrobial Suture).

Methods have been disclosed for vapor transfer of a vaporizable antimicrobial agent to a medical device such as a suture by placing the device in an inner package having a source of antimicrobial agent, covering the inner package with an outer package, and subjecting the device and package to time, temperature and pressure conditions sufficient to vapor transfer the antimicrobial agent from the antimicrobial agent source to the device (e.g., U.S. Pat. Nos. 7,513,093; 8,112,973; 8,133,437; 8,156,718; 8,668,867; 8,960,422; 9,044,531; 9,149,273; 9,474,524; 9,597,067; 9,597,072). This vapor transfer process has demonstrated success in transferring an antimicrobial agent to polymer or paper materials (such as surgical sutures or packaging materials).

When applied to orthopedic implants, coatings with antibiotics such as gentamicin can interfere with the ability of interlocking components (such as bone plates with interlocking bone fasteners) to remain securely connected to one another following implantation and degradation of the coating. For example, a PLGA coating containing particulate gentamicin can interfere with the locking function of a trauma plate that is secured with bone fasteners and cause a significant reduction in the amount of torque that is required to release the fasteners from the plate. A need remains for systems and techniques that impart antimicrobial properties to orthopedic implants and components thereof without interfering with the interlocking function of such devices.

SUMMARY

Provided herein are orthopedic implants or a component of an orthopedic implant for reducing microbial growth at a surgical site comprising a body defining a body outer surface; a biodegradable polymer thin film disposed along at least a portion of the body outer surface; and, a vaporizable antimicrobial agent disposed within the biodegradable polymer thin film, wherein one or more of the following applies: the biodegradable polymer thin film has a surface area coat weight of about 50-250 $\mu g/cm^2$, the vaporizable antimicrobial agent has a surface area concentration of about 5-85 $\mu g/cm^2$, or, the surface area concentration of the antimicrobial agent is sufficient to produce an effective zone of inhibition of at least 0.5 mm from a periphery of the outer surface.

Also provided herein are methods for preparing an orthopedic implant or a component of an orthopedic implant that reduces microbial growth at a surgical site.

The present disclosure also provides systems for reducing microbial infection at an orthopedic implant surgical site, kits comprising at least one orthopedic implant body and a plurality of bone fasteners that respectively reduce microbial infection at an orthopedic implant surgical site, as well as methods for reducing a loss of release torque resulting from an antimicrobial treatment of an orthopedic implant system.

DETAILED DESCRIPTION OF ILLUSTRATIVE EMBODIMENTS

Figure 1A:
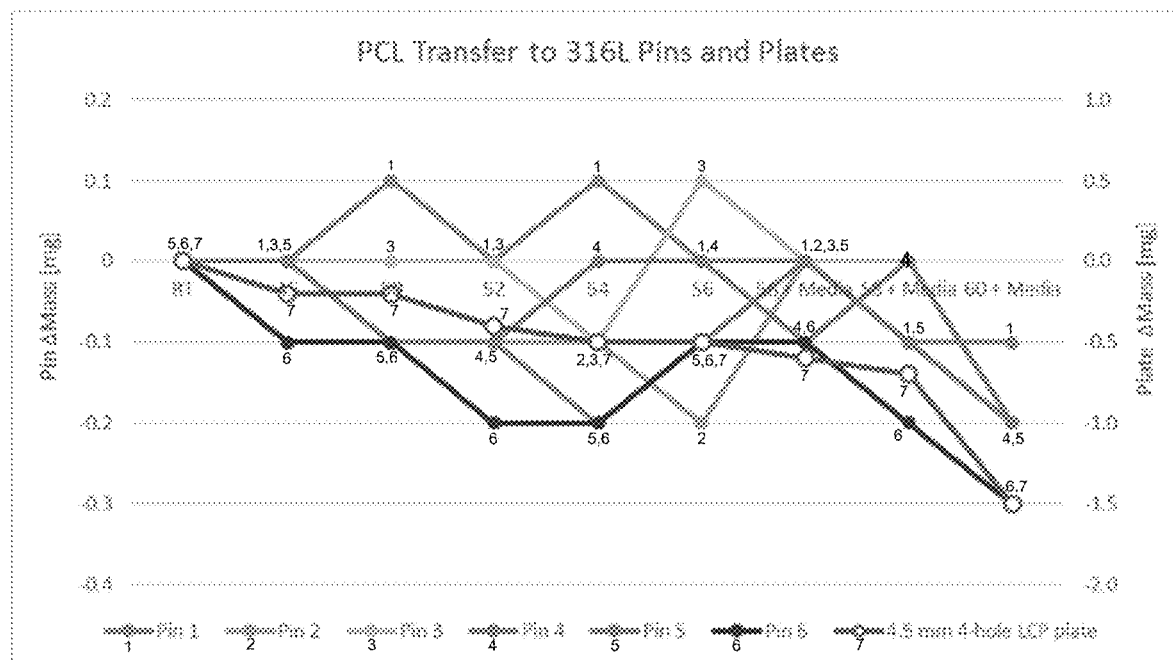
FIGS. 1A-1C provide the results of an assessment of the ability of tumbling of stainless steel orthopedic implant components with polymer pellets to coat the surfaces of such components.

The presently disclosed inventive subject matter may be understood more readily by reference to the following detailed description taken in connection with the accompanying examples, which form a part of this disclosure. It is to be understood that these inventions are not limited to the specific components, methods, or parameters described and/or shown herein, and that the terminology used herein is for the purpose of describing particular embodiments by way of example only and is not intended to be limiting of the claimed inventions.

The entire disclosures of each patent, patent application, and publication cited or described in this document are hereby incorporated herein by reference.

As employed above and throughout the disclosure, the following terms and abbreviations, unless otherwise indicated, shall be understood to have the following meanings.

In the present disclosure the singular forms "a," "an," and "the" include the plural reference, and reference to a particular numerical value includes at least that particular value, unless the context clearly indicates otherwise. Thus, for example, a reference to "a polymer" is a reference to one or more of such polymers and equivalents thereof known to those skilled in the art, and so forth. Furthermore, when indicating that a certain element "may be" X, Y, or Z, it is not intended by such usage to exclude in all instances other choices for the element.

When values are expressed as approximations, by use of the antecedent "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. In some embodiments, "about X" (where X is a numerical value) refers to ±10% of the recited value, inclusive. For example, the phrase "about 8" can refer to a value of 7.2 to 8.8, inclusive. This value may include "exactly 8". Where present, all ranges are inclusive and combinable. For example, when a range of "1 to 5" is recited, the recited range should be construed as optionally including ranges "1 to 4", "1 to 3", "1-2", "1-2 & 4-5", "1-3 & 5", and the like. In addition, when a list of alternatives is positively provided, such a listing can also include embodiments where any of the alternatives may be excluded. For example, when a range of "1 to 5" is described, such a description can support situations whereby any of 1, 2, 3, 4, or 5 are excluded; thus, a recitation of "1 to 5" may support "1 and 3-5, but not 2", or simply "wherein 2 is not included."

As used herein "zone of inhibition" (ZOI) means the distance measured from the periphery of an implant where there is no measurable microbial colony forming units (e.g., microbial activity), when the implant is placed in an in vitro environment inoculated with a known quantity of colony forming microorganisms. In certain literature, ZOIs are measured as the entire cross-sectional length of an area (e.g., a diameter) where no measurable microbial activity is present and can include the implant's dimensions as well.

As used herein "clinically effective zone of inhibition" means a ZOI measurement of at least 0.5 mm around the perimeter of an implant that is free of measurable bacterial growth.

When used in reference to a chemical compound, such as an antimicrobial agent, "vaporizable" means a compound that can evaporate when exposed to temperatures above 50° C. at ambient pressure conditions.

As described above, orthopedic implants are subject to microbial contamination, and previous efforts to impart antimicrobial properties have led to interference with the ability of interlocking components (such as bone plates with interlocking bone fasteners) to remain securely connected to one another following implantation. It is often the case that there are specific tolerances for an orthopedic implant to achieve an appropriate fit (for example, an IM nail going into the medullary canal of a femur), and in such instances it would be unacceptable for the implant to include a coating that renders the implant incompatible with such tolerances. An implant diameter that is oversized due to a thick coating that will subsequently degrade will result in the implant becoming loose or unstable. In addition, implants that are configured to have spaces for tissue ingrowth would be incompatible with a thicker coating that would occlude some or all of those spaces, and thereby interfere with natural tissue remodeling via ingrowth into the implant. Thus, it is critical for any strategy for imparting antimicrobial characteristics is compatible with all intended uses of an orthopedic implant.

The present inventors have surprisingly discovered that the use of ultrathin biodegradable coatings that are impregnated with antimicrobial agents can impart antimicrobial properties on orthopedic implants and components thereof within a clinically significant zone of inhibition, while avoiding interference with the interlocking function that is critical for the ability of the implant to remain securely situated at the surgical site, and avoiding situations in which the implant is rendered incompatible with fit tolerances and tissue ingrowth, as appropriate.

Accordingly, provided herein are orthopedic implants or a component of an orthopedic implant for reducing microbial growth at a surgical site comprising a body defining a body outer surface; a biodegradable polymer thin film disposed along at least a portion of the body outer surface; and, a vaporizable antimicrobial agent disposed within the biodegradable polymer thin film, wherein one or more of the following applies: the biodegradable polymer thin film has a surface area coat weight of about 50-250 $\mu g/cm^2$, the vaporizable antimicrobial agent has a surface area concentration of about 5-85 $\mu g/cm^2$, or, the surface area concentration of the antimicrobial agent is sufficient to produce an effective zone of inhibition of at least 0.5 mm from a periphery of the outer surface.

Any orthopedic implant or component of an orthopedic implant may be used pursuant to the presently disclosure. Orthopedic implants are understood to be implantable medical devices that either aid in the repair of damaged bone, or are a prosthesis used for replacing bone. An exemplary, and non-limiting, list of suitable orthopedic implants according to the present disclosure can include bone plates, intramedullary nails, bone screws, pins, spinal rods, K-wires, intervertebral disc replacements, metal compression staples (e.g., Nitinol), metal meshes such as used in craniomaxillofacial applications, external fixation screws or pins (e.g., Schanz screws and Steinmann pins), as well as joint replacement components used in hip, knee, and shoulder replacement procedures, such as, acetabular cups, femoral stems, tibial trays, artificial patella, and femoral condyle components.

As described, the orthopedic implant defines an outer surface. The outer surface according to certain embodiments may comprise a metal or metal alloy, a polyaryletherketone (PAEK) or copolymer thereof, or a polyalkene or copolymer thereof, or any combination of the aforementioned materials. Suitable metals can include, for example, titanium, stainless steel, nickel, cobalt, chromium, and metal alloys of the same. A preferred polyalkene is polyethylene or copolymer thereof. Suitable examples include high density polyethylene (HDPE), ultrahigh molecular weight polyethylene (UHMWPE), medium density polyethylene (MDPE), ultra low molecular weight polyethylene (ULMWPE), high molecular weight polyethylene (HMWPE), high density cross-linked polyethylene (HDXLPE), cross-linked polyethylene (PEX or XLPE), linear low density polyethylene (LLDPE), low density polyethylene (LDPE), or very low density polyethylene (VLDPE), as well as blends or copolymers thereof. Under certain elevated temperature conditions as will be further described below, one of skill in the art can determine which polyalkenes or copolymers thereof have the necessary chemical properties to withstand conditions requiring elevated temperatures; e.g., greater than 100 C without suffering thermal degradation or other undesired effects. Suitable examples of PAEK polymers include but are not limited to, polyetheretherketone (PEEK) carbon reinforced PEEK, polyetherketoneketone (PEKK), polyetherketone (PEK), or polyetherketoneetherketoneketone (PEKEKK), or blends or copolymers thereof.

The biodegradable polymer thin film is effectively formed integrally with and attached to the underlying orthopedic implant or component thereof. The surface area coat weight of the biodegradable polymer thin film may be about 60-230 $\mu g/cm^2$. In some embodiments, the surface area coat weight of the biodegradable polymer thin film is about 50, 60, 70, 80, 90, 100, 110, 120, 130, 140, 150, 160, 170, 180, 190, 200, 210, 220, 230, 240, or 250 $\mu g/cm^2$.

The biodegradable polymer thin film may comprise a poly($\alpha$-hydroxy ester) polymer. For example, the biodegradable polymer thin film may comprise poly(glycolic acid) (PGA), poly(lactic acid) (PLA), poly(lactic-co-glycolic acid) (PLGA), poly ($\epsilon$-caprolactone) (PCL), or any copolymer or mixture thereof. In certain embodiments, the biodegradable polymer thin film comprises poly(l-lactic acid) (PLLA), poly(d-lactic acid) (PDLA), poly(d,l-lactic acid) (PDLLA), or any copolymer or mixture thereof.

In certain embodiments, the vaporizable antimicrobial agent has a surface area concentration of about 5-85 $\mu g/cm^2$. For example, the antimicrobial agent may have a surface area concentration of about 45-55 $\mu g/cm^2$. In some embodiments, the vaporizable antimicrobial agent has a surface area concentration of about 5, 10, 15, 20, 25, 30, 35, 40, 45, 50, 55, 60, 65, 70, 75, 80, or 85 $\mu g/cm^2$.

The vaporizable antimicrobial agent may be any compound or substance that confers the ability to reduce the formation of microbial colony forming units at the surface of an orthopedic implant, and preferably within a zone of inhibition around the implant. In certain embodiments, the vaporizable antimicrobial agent is a halogenated hydroxyl ether, a acyloxydiphenyl ether, or a combination thereof. In particular, the antimicrobial agent may be a halogenated 2-hydroxydiphenyl ether and/or a halogenated 2-acyloxy diphenyl ether, for example, as represented by the following formula:

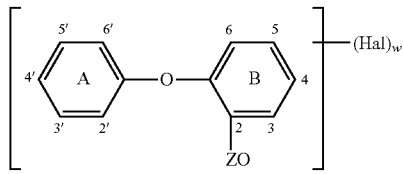

In the above formula, each Hal represents identical or different halogen atoms, Z represents hydrogen or an acyl group, and w represents a positive whole number ranging from 1 to 5, and each of the benzene rings, but preferably ring A can also contain one or several lower alkyl groups which may be halogenated, a lower alkoxy group, the allyl group, the cyano group, the amino group, or lower alkanoyl group. Preferably, methyl or methoxy groups are among the useful lower alkyl and lower alkoxy groups, respectively, as substituents in the benzene rings. A halogenated lower alkyl group, trifluoromethyl group is preferred.

Antimicrobial activity similar to that of the halogen-o-hydroxy-diphenyl ethers of the above formula is also attained using the O-acyl derivatives thereof which partially or completely hydrolyze under the conditions for use in practice. The esters of acetic acid, chloroacetic acid, methyl or dimethyl carbamic acid, benzoic acid, chlorobenzoic acid, methylsulfonic acid and chloromethylsulfonic acid are particularly suitable.

One particularly preferred antimicrobial agent within the scope of the above formula is 2,4,4'-trichloro-2'-hydroxydiphenyl ether, commonly referred to as triclosan. Triclosan is a broad-spectrum antimicrobial agent that has been used in a variety of products and is effective against a number of organisms commonly associated with SSIs. Such microorganisms include, but are not limited to, genus *Staphylococcus*, *Staphylococcus epidermidis*, *Staphylococcus aureus*, methicillin-resistant *Staphylococcus epidermidis*, methicillin-resistant *Staphylococcus aureus*, and combinations thereof.

In certain embodiments, the surface area concentration of the antimicrobial agent is sufficient to produce an effective zone of inhibition of about 0.5-4 mm from a periphery of the outer surface of the orthopedic implant or component thereof. For example, the surface area concentration of the antimicrobial agent may be sufficient to produce an effective zone of inhibition of about 0.5, 0.75, 1.0, 1.25, 1.5, 1.75, 2.0, 2.25, 2.5, 2.75, 3.0, 3.5, 3.75, or 4 mm from a periphery of the outer surface of the orthopedic implant or component thereof. In some embodiments, the surface area concentration of the antimicrobial agent is sufficient to produce an effective zone of inhibition of about 1-2 mm from a periphery of the outer surface of the implant or component. The surface area concentration of the antimicrobial agent may be sufficient to produce the effective zone of inhibition according to the preceding embodiments up to about 6, 12, 18, 24, 36, 48, or 72 hours following implantation of the orthopedic implant or component into a human subject.

The biodegradable polymer thin film may be present on some or all of the outer surfaces of the body of the implant or component thereof. In certain embodiments, the orthopedic implant includes apertures that are configured to receive a fastener, and the surfaces of the aperture include the biodegradable polymer thin film. When the component of the orthopedic implant is the fastener, such as a threaded fastener that includes a head that contacts the surfaces of an aperture of an orthopedic implant when implanted at the surgical site, the biodegradable polymer thin film may, for example, be on the surfaces of the threaded portions of the fastener, the surfaces of the head, or both. In this manner, when the implant includes a bone plate or a bone fastener, the surfaces of the bone plate and the surfaces of the bone fastener that contact each other when the respective parts are implanted at the surgical site both include the biodegradable polymer thin film. As disclosed more fully herein, the use of a biodegradable polymer thin film in accordance with the present disclosure on such surfaces of orthopedic implants does not interfere with the physical interaction of components that are configured to interlock with one another.

Also disclosed herein are methods for preparing an orthopedic implant or a component of an orthopedic implant that reduces microbial growth at a surgical site comprising applying on a surface of the implant or component of an implant a biodegradable polymer thin film; and, incorporating a vaporizable antimicrobial agent into the thin film, wherein the vaporizable antimicrobial agent has a surface area concentration of about 5-85 $\mu g/cm^2$, the biodegradable polymer thin film has a surface area coat weight of about 50-250 $\mu g/cm^2$, or, the surface area concentration of the antimicrobial agent is sufficient to produce an effective zone of inhibition of at least 0.5 mm from a periphery of the outer surface.

Application of the biodegradable polymer thin film onto a surface of the implant or component of an implant may be performed by any technique that is capable of producing a surface area coat weight in accordance with the present disclosure, such as a surface area coat weight of about 50-250 $\mu g/cm^2$. For example, the thin film is applied to the surface of the implant or component of an implant by dip coating, i.e., by dipping the implant or component of an implant into a coating solution comprising the biodegradable polymer. Other techniques may include spraying a coating solution comprising the biodegradable polymer onto the surface of the implant or component. Those of ordinary skill in the art can readily identify other acceptable approaches for applying the biodegradable polymer thin film onto a surface of the implant or component of an implant.

The antimicrobial agent may be incorporated into the thin film by vapor transfer from a source of the antimicrobial agent. Vapor transfer processes and suitable sources of antimicrobial agent are well known among those of ordinary skill in the art, and any effective manner of accomplishing the vapor transfer may be used.

Pursuant to the present methods, the characteristics of the orthopedic implant or component thereof, the biodegradable polymer thin film, the vaporizable antimicrobial agent, the zone of inhibition, and pertinent features may be in accordance with the description provided supra in connection with the presently disclosed orthopedic implants or a component of an orthopedic implant for reducing microbial growth at a surgical site.

Also disclosed herein are systems for reducing microbial infection at an orthopedic implant surgical site comprising an orthopedic implant body defining an outer implant surface, the orthopedic implant body further defining one or more apertures extending from the outer surface through the implant body and configured to receive a bone fastener; a bone fastener configured to be disposed within the one or more apertures so as to secure the orthopedic implant body to a bone, the bone fastener defining an outer fastener surface; an biodegradable polymer thin film disposed along at least a portion of the outer implant surface or the outer fastener surface; and, a vaporizable antimicrobial agent disposed within the biodegradable polymer thin film, wherein the biodegradable polymer thin film has a surface area coat weight of about 50-250 $\mu g/cm^2$, the vaporizable antimicrobial agent has a surface area concentration of about 5-85 $\mu g/cm^2$, the surface area concentration of the antimicrobial agent is sufficient to produce an effective zone of inhibition of at least 0.5 mm from a periphery of the outer implant surface, or, the torque required for releasing the fastener from a corresponding aperture of the orthopedic implant body following use of an insertion torque that is suitable for implantation of the orthopedic implant body in a subject is not less than about 90% of the torque required for releasing an uncoated and otherwise identical fastener from a corresponding aperture of an uncoated but otherwise identical orthopedic implant body for up to 5 days following implantation of the orthopedic implant body in the subject.

In accordance with the present systems, the use of a biodegradable polymer thin film having the characteristics disclosed herein on surfaces of orthopedic implants and fasteners does not interfere with the physical interaction of such components when they are configured to interlock with one another in order to secure the implant within the surgical site, e.g., onto a bone surface of a subject. An important measure of whether a coating on implant surfaces interferes with such physical interactions is the ability of the implant system to retain the amount of torque required for releasing the respective components from one another, e.g., a fastener from a corresponding aperture of the orthopedic implant body, following use of an insertion torque that is suitable for implantation of the orthopedic implant in a subject. In some embodiments of the present systems, the torque required for releasing the fastener from a corresponding aperture of the orthopedic implant body following use of an insertion torque that is suitable for implantation of the orthopedic implant body in a subject is not less than about 90% of the torque required for releasing an uncoated and otherwise identical fastener from a corresponding aperture of an uncoated but otherwise identical orthopedic implant body for up to 5 days following implantation of the orthopedic implant body in the subject. For example, the torque required for releasing the fastener from a corresponding aperture of the orthopedic implant body following use of an insertion torque that is suitable for implantation of the orthopedic implant body in a subject is not less than about 91, 92, 93, 94, 95, 96, 97, 98, or 99% of the torque required for releasing an uncoated and otherwise identical fastener from a corresponding aperture of an uncoated but otherwise identical orthopedic implant body. Such release torques may be required for a period of up to 5 days, e.g., up to 6 hours, 12 hours, 18 hours, 24 hours, 36 hours, 48 hours, 60 hours, 72 hours, 84 hours, 96 hours, 108 hours, or 120 hours following implantation of the orthopedic implant body in the subject.

Pursuant to the present systems, the characteristics of the orthopedic implant or fastener, the biodegradable polymer thin film, the vaporizable antimicrobial agent, the zone of inhibition, and other pertinent features may be in accordance with the description provided supra in connection with the presently disclosed orthopedic implants or a component of an orthopedic implant for reducing microbial growth at a surgical site, and in connection with the presently disclosed methods for preparing an orthopedic implant or a component of an orthopedic implant that reduces microbial growth at a surgical site.

Also disclosed herein are kits that comprise at least one orthopedic implant body defining an outer implant surface, the orthopedic implant body further defining one or more apertures extending from the outer surface through the implant body and configured to receive a bone fastener; a plurality of bone fasteners configured to be disposed within an aperture of at least one of the orthopedic implant bodies so as to secure the orthopedic implant body to a bone, each of the bone fasteners respectively defining an outer fastener surface; a biodegradable polymer thin film disposed along at least a portion of the outer implant surface of each of the orthopedic implant bodies, disposed along at least a portion of the outer fastener surface of each of the bone fasteners, or both; and, a vaporizable antimicrobial agent disposed within the biodegradable polymer thin film, wherein the biodegradable polymer thin film has a surface area coat weight of about 50-250 μg/cm², the vaporizable antimicrobial agent has a surface area concentration of about 5-85 μg/cm², the surface area concentration of the antimicrobial agent is sufficient to produce an effective zone of inhibition of at least 0.5 mm from a periphery of the outer implant surface, or, the torque required for releasing one of the fasteners from a corresponding aperture of one of the orthopedic implant bodies following use of an insertion torque that is suitable for implantation of the orthopedic implant body in a subject is not less than about 90% of the torque required for releasing an uncoated and otherwise identical fastener from a corresponding aperture of an uncoated but otherwise identical orthopedic implant body for up to 5 days following implantation of the orthopedic implant body in the subject.

The present kits therefore contain one or more orthopedic implant bodies that are configured by the inclusion of apertures to receive a bone fastener, as well as a plurality of bone fasteners for use in securing the orthopedic implant body to a bone, and to the extent needed, the kits may contain a plurality of orthopedic implant bodies that are respectively of the same or different types, as well as corresponding bone fasteners that individually vary as needed for compatibility with the provided orthopedic implant bodies. The kits can be arranged such that, for example, they include all of the implant components required for completing a particular implant procedure.

Pursuant to the present kits, the characteristics of the orthopedic implant body or fastener, the biodegradable polymer thin film, the vaporizable antimicrobial agent, the zone of inhibition, the release torque characteristics, and other pertinent features may be in accordance with the description provided supra in connection with the presently disclosed orthopedic implants or a component of an orthopedic implant for reducing microbial growth at a surgical site, in connection with the presently disclosed methods for preparing an orthopedic implant or a component of an orthopedic implant that reduces microbial growth at a surgical site, and in connection with the presently disclosed systems for reducing microbial infection at an orthopedic implant surgical site.

The present disclosure also provides methods for reducing a loss of release torque resulting from an antimicrobial treatment of an orthopedic implant system that includes an orthopedic implant body defining an outer implant surface, the orthopedic implant body further defining one or more apertures extending from the outer implant surface through the implant body and configured to receive a bone fastener, and a bone fastener configured to be disposed within the one or more apertures so as to secure the orthopedic implant body to a bone, the bone fastener defining an outer fastener surface, the method comprising: applying to one of the apertures, the corresponding outer fastener surface, or both a biodegradable polymer thin film, and, incorporating a vaporizable antimicrobial agent into the thin film, wherein the biodegradable polymer thin film has a surface area coat weight of about 50-250 μg/cm², the vaporizable antimicrobial agent has a surface area concentration of about 5-85 μg/cm², the surface area concentration of the antimicrobial agent is sufficient to produce an effective zone of inhibition of at least 0.5 mm from a periphery of the outer implant surface, or, the torque required for releasing one of the fasteners from a corresponding aperture of one of the orthopedic implant bodies following use of an insertion torque that is suitable for implantation of the orthopedic implant body in a subject is not less than about 90% of the torque required for releasing an uncoated and otherwise identical fastener from a corresponding aperture of an uncoated but otherwise identical orthopedic implant body for up to 5 days following implantation of the orthopedic implant body in the subject.

Pursuant to the present methods, the characteristics of the orthopedic implant body or fastener, the biodegradable polymer thin film, the vaporizable antimicrobial agent, the zone of inhibition, the release torque characteristics, and other pertinent features may be in accordance with the description provided supra in connection with the presently disclosed orthopedic implants or a component of an orthopedic implant for reducing microbial growth at a surgical site, in connection with the presently disclosed methods for preparing an orthopedic implant or a component of an orthopedic implant that reduces microbial growth at a surgical site, in connection with the presently disclosed systems for reducing microbial infection at an orthopedic implant surgical site, and in connection with the presently disclosed kits.

EXAMPLES

The present invention is further defined in the following Examples. It should be understood that these examples, while indicating preferred embodiments of the invention, are given by way of illustration only, and should not be construed as limiting the appended claims From the above discussion and these examples, one skilled in the art can ascertain the essential characteristics of this invention, and without departing from the spirit and scope thereof, can make various changes and modifications of the invention to adapt it to various usages and conditions.

Example 1—Conventional Vapor Transfer of Antimicrobial Agent to Implant Surface

Vapor transfer of triclosan on to metal orthopedic implants was attempted according to the process described in U.S. Pat. No. 8,668,867 to determine if the process described could effectively deposit triclosan onto a metal surface.

A series of metal pins (approximately 4 mm×30 mm) including 1) titanium alloy (Ti-6Al-7Nb (TAN)), 2) 316L Stainless Steel, and, 3) TAN pins having poly(D,L-lactide) (PLA) coating at about 0.55 mg/cm² were tested.

Triclosan (IRGACARE MP Triclosan Lot #0013227542) was compounded at 2.56% by weight into a sheet of High Density Polyethylene (HDPE).

The pins were co-packaged with 0.62 to 0.66 grams of triclosan impregnated HDPE sheet (approximately 16 mg of triclosan) into a 4-layer packaging material suitable for EO sterilization that had an outer PET layer, a polyethylene layer, a foil moisture barrier, and an inner polyethylene heat-sealing layer, with a foil layer (moisture barrier) disposed in between the two. The package was EO sterilized, and underwent a heat treatment at 55° C. for 4 hours.

After the EO sterilization and heat treatment process was completed, the pins were measured for anti-bacterial activity. *S. aureus* at $3.03 \times 10^9$ CFU/mL was spread on preformed plate by sterile cotton swab, and the pins were gently pressed into the surface of spread plate, but not penetrating agar. The plates were incubated for 24 hours and then ZOIs measured for each pin.

Total Zone was measured across the width (short axis) of the implant and the results were as follows. Stainless:

minimal observed zone of reduced growth (no ZOI); TAN: minimal observed zone of reduced growth (no ZOI); TAN-PLA: 12.4 mm ZOI.

Accounting for the implant width (~4.0 mm) and dividing by 2 to account for the ZOI on each side of the implant, the ZOI around the perimeter for each implant type was as follows. Stainless: Not observed; TAN: Not observed; TAN-PLA: 4.2 mm.

Thus, the results showed that only the polymer coated pins (TAN-PLA) were able to provide a clinically effective ZOI, and the pins with only a metal substrate surface were unable to retain a clinically significant amount of triclosan.

Example 2—Transfer of Polymer to Implant Surface by Tumbling

Tumbling of stainless steel materials with polycaprolactone pellets at temperatures from 45 to 60 Celsius was evaluated. Six 4 mm diameter and 30 mm length 316L stainless steel pins and one 4-hole trauma plate (DePuy Synthes 224.541 80, mm long×13.5 mm wide×approximately 5 mm thick) were placed in a rubber octagonal tumbling chamber with 245 grams of polycaprolactone pellets (Polysciences 26290-600, MW 80,000). The temperature was incremented at 45, 50, 32, 54, and 56° C. with a period of tumbling from 1.5-2 hours at each temperature. Tumbling media (322 grams) was added and heating continued (56, 58, and 60° C.) Observation of the polycaprolactone appearance, metal parts appearance, and metal part mass was observed at each temperature increment.

Figure 1B:
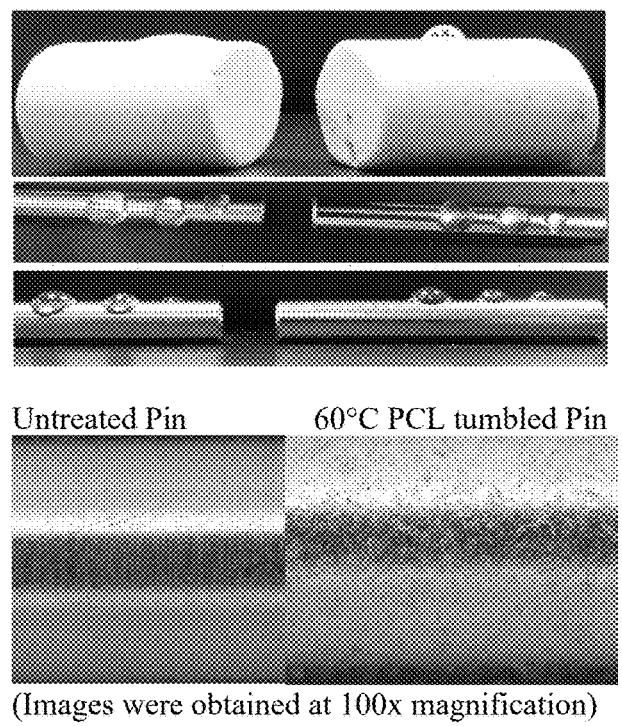
Figure 1C:
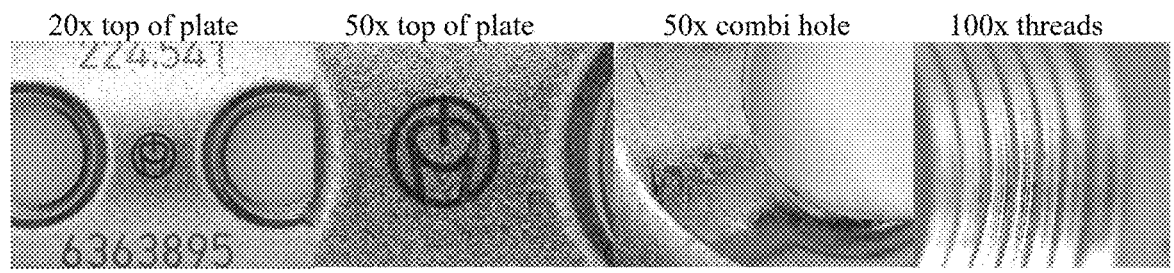

Pin mass did not change appreciably over the range of heating (FIG. 1A). The changes in mass are in the tenths of a milligram, at the same resolution as the balance. However, a downward trend in the mass of the trauma plate was observed (FIG. 1A). The transfer of polycaprolactone could not be measured by mass balance. However, the air-water-contact angle of the pins and tumbling media changed significantly, indicating modification of the surfaces by polycaprolactone. Microscopy demonstrated evidence of PCL transfer to the surface of the pins (FIG. 1B) and the trauma plate (FIG. 1C), but deposition of PCL onto the locking threads was not noted (FIG. 1C). This has the advantage of avoiding polymer contamination of the locking features of the trauma plate.

Figure 2A:
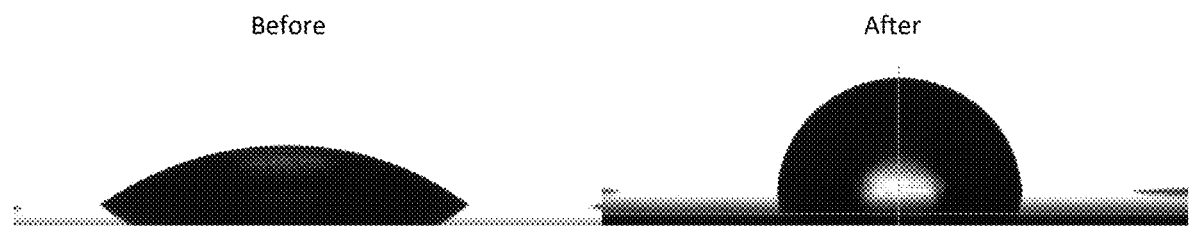
FIGS. 2A-2C provide the results of an evaluation of the ability of tumbling and dip coating to produce polymer coatings that can retain antimicrobial agents in order to confer clinically effective zones of inhibition with respect to the coated components.
Figure 2B:
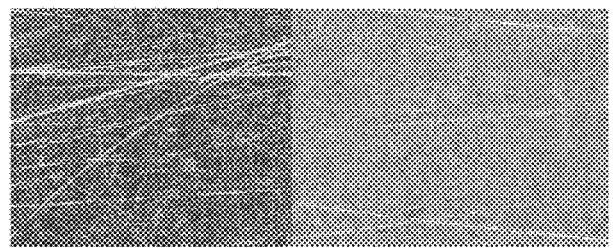

Example 3—Comparison Among PCL Tumbling, Ultrathin Dip Coating, and Conventional Polymer Coating of Orthopedic Implants Samples were fabricated for the purposes of evaluating a minimal polymer coating that could imbue enduring antimicrobial activity. Samples were 54 mm×12.5 mm 316L plates that were a rectangular representation of a trauma plate suitable for zone of inhibition studies, referred to as a "flat plate." Two particular processes were used: manual dip coating in a 4.5% wt/wt polylactide-ethyl acetate solution and tumbling in polycaprolactone pellets (245 grams Polysciences 26290-500, MW 80,000) and tumbling media (322 grams) at 56° C. for 16 hours. Manual dip coating resulted in an average coat weight of 53 µg/cm². Polylcaprolactone tumbling did not produce an increase in sample mass; rather, the tumbling process removed mass from the 316L samples (28 mg from a 15.7 gram 316L plate). However, the coating of samples with polycaprolactone was confirmed by microscopy and an increase in air-water-contact angle (FIG. 2A).

Triclosan vapor transfer from PE-triclosan sheet test samples was performed by placing 0.65±0.02 grams of the triclosan-containing PE sheet into a foil sterilization pouch with the material to be treated. The pouch was heat sealed and triclosan transfer was completed at 55° C. for approximately 4 hours.

The following samples were triclosan treated in the same batch:
  316L stainless steel pin 4 mm dia×30 mm long,
  316L flat plate,
  53 µg/cm² polylactide-coated 316L plates,
  60° C. PCL tumbled 316L pins from example #2,
  56° C. PCL tumbled 316L flat plates,
  19 mm PEEK disc,
  Rapidsorb 85:15 PLGA plate (Synthes PN 851.421.01S),
  Porous Polyethylene (Synthes PN 08.510.1305 cut to 13 mm×50 mm).

Three 0.59 mg/cm² polylactide-coated pins from Example 1 were also included. For those samples triclosan transfer was conducted during both EO sterilization and a 4 hour 55° C. oven treatment.

Figure 2C:
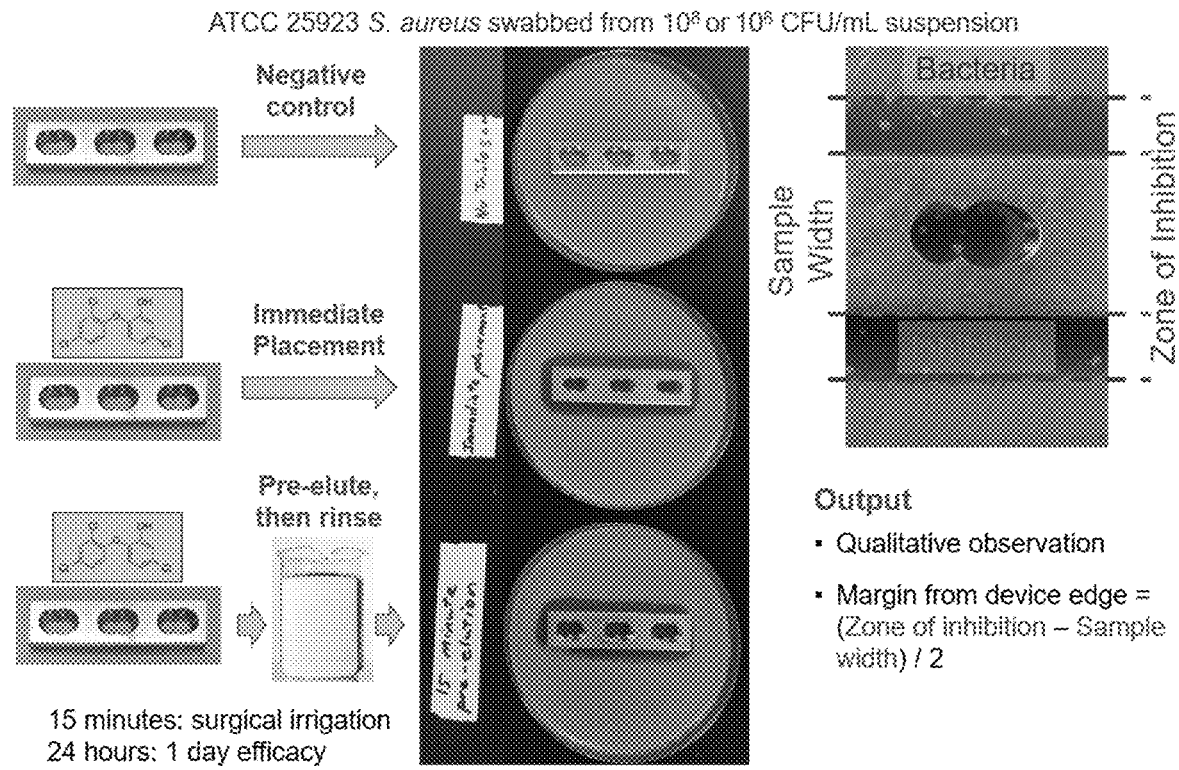

The antimicrobial activity of triclosan transfer treated samples was evaluated by a zone of inhibition assay performed after a phosphate buffered incubation period (FIG. 2C). A culture of *S. aureus* ATCC 25923 at approximately $10^8$ CFU/mL was spread on pre-formed plate by sterile cotton swab, and the samples were gently pressed into the surface of spread plate. Samples would either be placed on the ZOI directly upon removal from the pouch or samples were placed into 12 mL of PBS for 15 minutes or 24 hours. The PBS incubated samples were further rinsed in 12 mL of PBS prior to placing on the ZOI dish. Care was taken to place the sample onto the ZOI spread plate with the side opposite the PE-strip facing the bacteria. This would present the worst-case for triclosan transfer from the PE strip within the pouch. After 24 hours of bacterial growth, the zone width and sample width were measured. The zone of inhibition was measured as the margin from the edge of the implant calculated as (zone width−sample width)/2.

Table 1 describes the measured zone of inhibition around metal pins and plates and example polymeric medical device materials. "Shadow" means minimal observed zone of reduced growth (no ZOI). "Localized" means that a zone was observed only in some regions adjacent to the sample, i.e., a consistent zone of inhibition was not observed but some activity was present.

TABLE 1

| | | Pre-incubation | Zone Margin from Device Edge [mm] |
|---|---|---|---|
| 4 mm diameter × 30 mm long pin samples | 316 L Pin | None | shadow |
| | | 15 minutes | 0 |
| | | 24 hours | 0 |
| | PCL tumbled pin | None | 1.1 |
| | | 15 minutes | 0.0 |
| | | 24 hours | 0.0 |
| | 0.59 mg/cm² PLA dipped pin | None | 4.5 |
| | | 15 minutes | 4.3 |
| | | 24 hours | 2.8 |
| 54 mm long × 12.5 mm wide flat plates | 316 L flat plate | None | Shadow |
| | | 15 minutes | 0.0 |
| | | 24 hours | 0.0 |
| | PCL tumbled flat plate | None | 3.5 |
| | | 15 minutes | Shadow |
| | | 24 hours | 0.0 |
| | 53 µg/cm² PLA dipped plate | None | 5.1 |
| | | 15 minutes | 4.5 |
| | | 24 hours | Localized |
| Polymeric medical devices | PEEK disc | None | 2.8 |
| | | 15 minutes | 1.5 |
| | | 24 hours | 0.9 |

TABLE 1-continued

|  | Pre-incubation | Zone Margin from Device Edge [mm] |
| --- | --- | --- |
| RapidSorb 85:15 PLGA plate | None | 2.9 |
|  | 15 minutes | 2.6 |
|  | 24 hours | Localized |
| Porous PE strip | None | 4.6 |
|  | 15 minutes | 3.5 |
|  | 24 hours | 1.5 |

Solid polymer samples consistently produced zones of inhibition with immediate placement onto the *S. aureus* spread plate or if placement was after 15 minutes of incubation in PBS. Zones or localized activity was present after 24 hours of incubation in PBS with solid polymer samples. Zones were not observed adjacent to stainless steel pins or plates; however, ultrathin coatings were able to improve zone endurance to incubating and rinsing in PBS. The PCL tumbling process produced an immediate zone of inhibition, but not one that endured PBS rinsing. An ultrathin 0.53 µg/cm² polylactide coating produced zones that endured 15 minutes of incubation, but only localized activity after 24 hours of incubation. A thicker coting of 0.59 mg/cm² polylactide on a titanium alloy pin produced robust zones that endured 24 hours of pre-elution. The minimum coat weight for producing a zone of inhibition after pre-incubation for 24 hours in PBS is between 53 and 590 µg/cm² for triclosan transfer performed at 55° C. for four hours from triclosan compounded into a polyethylene strip at 2.56%.

Example 4—Fabrication and Zone of Inhibition Evaluation

Polylactide dip coating solutions of 5% polylactide (Evonik Resomer 203S) in ethyl acetate and 8% polylactide in ethyl acetate were prepared and used to dip coat 7-hole 3.5 LCP 316L trauma plates (DPS PN223.571 98 mm long×11 mm wide). The samples were fixture horizontally in a stainless steel mesh tray and manually dipped into each solution, then raised to coat the plates with the solution. The samples were weighed prior to coating and after overnight drying to calculate the coat mass per the plate's 22.72 cm² area. The 5% polylactide in ethyl acetate solution produced a 102±5 µg/cm² coat weight and the 8% solution produced a 229±14 µg/cm² coat weight. Coating in a low viscosity polymer solution has the advantage of coating many different part sizes or shapes by a single method.

The trauma plates were co-packaged in foil pouches with 0.67±0.02 grams of polyethylene sheet compounded with 2.56% triclosan. Triclosan vapor transfer was performed in a preheated 55° C. oven for 4 hours and 31 minutes. The cooled samples were evaluated for zone of inhibition either directly from the package or after pre-elution in PBS for 15 or 24 hours. The zone of inhibition assay was performed by a pour plate method as follows:

Prepare an overnight bacterial inoculum of *Staphylococcus aureus* at a concentration of $10^9$ CFU/mL in 20 mL in house made TSB by incubating at 37° C. shaker.

Take an OD600 reading of a diluted stock of overnight culture to determine stock concentration with the absorbance method.

Adjust the concentration of bacteria to $10^5$ CFU/mL using 0.3% TSB making sure to forcibly aspirate up and down to break up clumps of colonies with a serological pipette from the stock concentration.

Plate the following dilutions onto in triplicates to TSA-L plates to determine the initial stock concentration of cells: $10^2$ CFU/mL.

Prepare TSA (20 g of Tryptic Soy agar in 500 mL of ultra-pure water and autoclave it at 121° C. for 30 min), cool the agar at 45° C. water bath. When the temperature of the agar reaches 45° C., take a sterile petri dish. Add inoculum (1.00E+05 CFU/mL) in the center of the petri dish, then slowly pour 15 mL of TSA. Close the lid and swirl the petri dish to mix the inoculum with agar. Avoid creating air bubbles.

Place the test sample in the center of the petri dish with the sterile forcep.

Place the plate on a flat surface undistrubed for about 10 minutes to allow the agar to completely gel.

Incubate the plates at 37° C. for 24 hours.

Measure zone of inhibition by image analysis

As shown in Table 2, below, the resulting zones indicate that 102 and 229 µg/cm² polylactide (Resomer 203S) coatings enable triclosan transfer at 55° C. and 4.5 hours to produce zones of inhibition that endure for at least 24 hours.

TABLE 2

| Coat weight | Pre-incubation | Plate width [mm] | Zone Width [mm] | Zone Margin from Device Edge [mm] |
| --- | --- | --- | --- | --- |
| 102 µg/cm² polylactide | None | 11 | 15.2 | 2.1 |
|  | 15 minutes | 11 | 14.8 | 1.9 |
|  | 24 hours | 11 | 14.5 | 1.8 |
| 229 µg/cm² polylactide | None | 11 | 15.9 | 2.4 |
|  | 15 minutes | 11 | 14.8 | 1.9 |
|  | 24 hours | 11 | 14.7 | 1.8 |

Example 5—Assessment of Release Torque of Polylactide-Coated Trauma Plates Versus 40% Gentamicin Sulfate in Poly(Lactide-Co-Glycolide) Coated Plates Locked trauma plating constructs must remain locked subsequent to implantation. A poly(lactide-co-glycolide) with 40% particulate gentamicin sulfate coating on trauma plates at a coat weight of approximately 3.5 mg/cm² was compared against the two ultrathin polylactide coatings of 102 µg/cm² and 229 µg/cm² polylactide with vapor transferred triclosan, prepared within Example #04. Locking screw heads were inserted into the plates using a calibrated torque sensor with 0.01 Nm precision. In the earlier study, a target insertion torque of 2.50 Nm was used with the PLGA-gentamicin plates. In the subject study, a target insertion torque of 1.50 Nm was used for the polylactide-triclosan plates. Each study had its own uncoated plate control group. The PLGA-gentamicin plates were dip-coated vertically, so the results for coated proximal and coated distal are displayed separately, for the coat weight is greater in the coated distal holes, for they retained more suspension in the coating process. The release torque was measured either the same day or after hydration and degradation of the polymer coating in pH 11 buffer for 5 days at 37° C. The release torque was tabulated and the % difference from release torque versus insertion for each study group is provided below in Tables 3 and 4.

TABLE 3

Release torque after insertion torque of 2.52 ± 0.04 Nm

| | | Average removal torque [Nm] | StDev removal Torque [Nm] | Removal torque of individual locking screws [Nm] | | | | | |
|---|---|---|---|---|---|---|---|---|---|
| Uncoated | Initial | 2.63 | 0.09 | 2.65 | 2.50 | 2.54 | 2.66 | 2.70 | 2.73 |
| | Degraded | 2.98 | 0.12 | 2.99 | 3.16 | 2.95 | 3.06 | 2.85 | 2.87 |
| Coated Proximal | Initial | 2.03 | 0.08 | 2.01 | 2.05 | 1.91 | 2.15 | 2.04 | 1.99 |
| | Degraded | 1.78 | 0.45 | 1.10 | 1.49 | 1.69 | 1.96 | 2.20 | 2.26 |
| Coated Distal | Initial | 1.57 | 0.40 | 1.82 | 1.91 | 1.19 | 0.97 | 1.61 | 1.89 |
| | Degraded | 0.60 | 0.20 | 0.96 | 70 | 0.48 | 0.43 | 0.49 | 0.52 |

TABLE 4

Release torque after insertion torque: 1.52 ± 0.01 Nm

| | | Average removal torque [Nm] | StDev removal Torque [Nm] | Removal torque of individual locking screws [Nm] | | | |
|---|---|---|---|---|---|---|---|
| Uncoated | Initial | 1.59 | 0.08 | 1.53 | 1.55 | 1.68 | |
| | Degraded | 1.52 | 0.16 | 1.29 | 1.60 | 1.65 | 1.54 |
| 102 μg/cm² polylactide | Initial | 1.39 | 0.05 | 1.33 | 1.40 | 1.43 | |
| | Degraded | 1.77 | 0.06 | 1.78 | 1.82 | 1.78 | 1.69 |
| 229 μg/cm² Polylactide | Initial | 1.36 | 0.06 | 1.32 | 1.33 | 1.43 | |
| | Degraded | 1.72 | 0.08 | 1.73 | 1.74 | 1.60 | 1.80 |

Figure 3A:
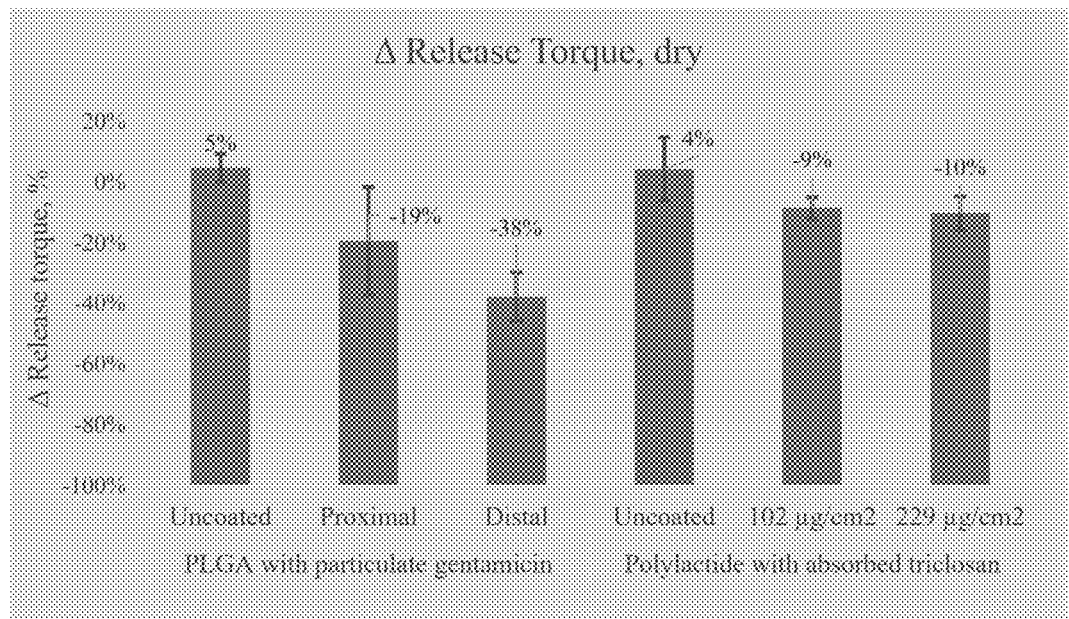
FIGS. 3A and B illustrate the results of an assessment of release torque following the use of conventional polymer coatings with particulate gentamicin and inventive biodegradable polymer thin films containing triclosan, respectively.
Figure 3B:
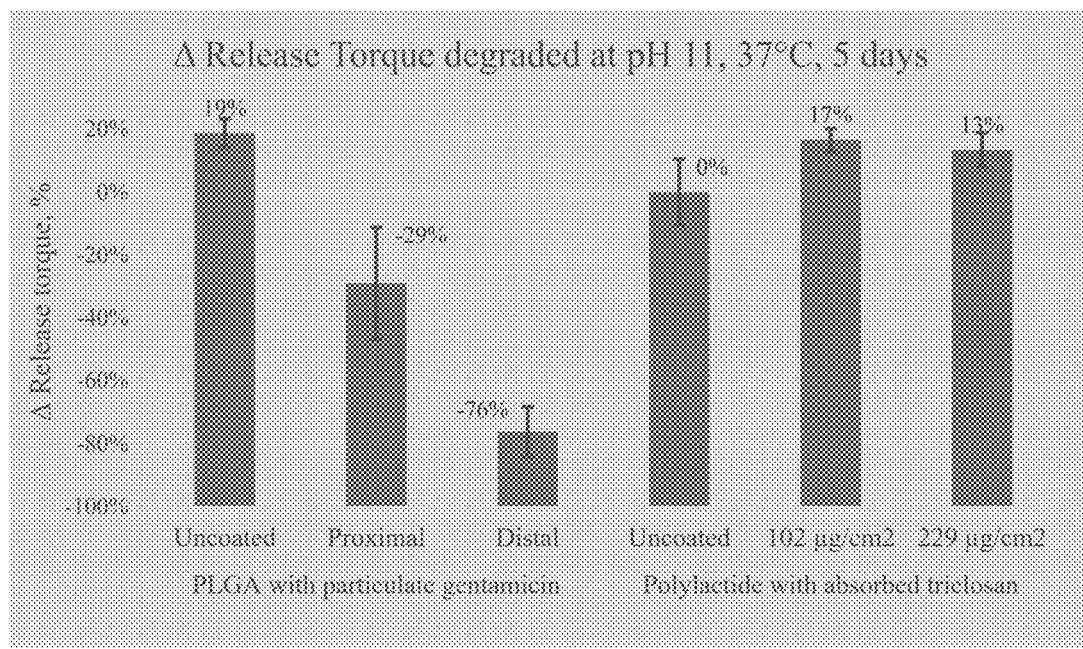

As shown in FIGS. 3A and 3B, an approximately 3.5 mg/cm² particulate gentamicin in PLGA conventional antibacterial coating interfered with the locking function of the trauma plate causing significant reduction in release torque both dry and after incubation in pH 11 buffer for 5 days. A 102 or 229 μg/cm² polylactide coating did not interfere with the locking function of the trauma plates. A 9-10% decrease in removal torque was observed during dry removal and surprisingly the removal torque increased upon incubation in pH 11 buffer for 5 days.

Example 6—Benchmarking Attachment and Proliferation

Figure 4:
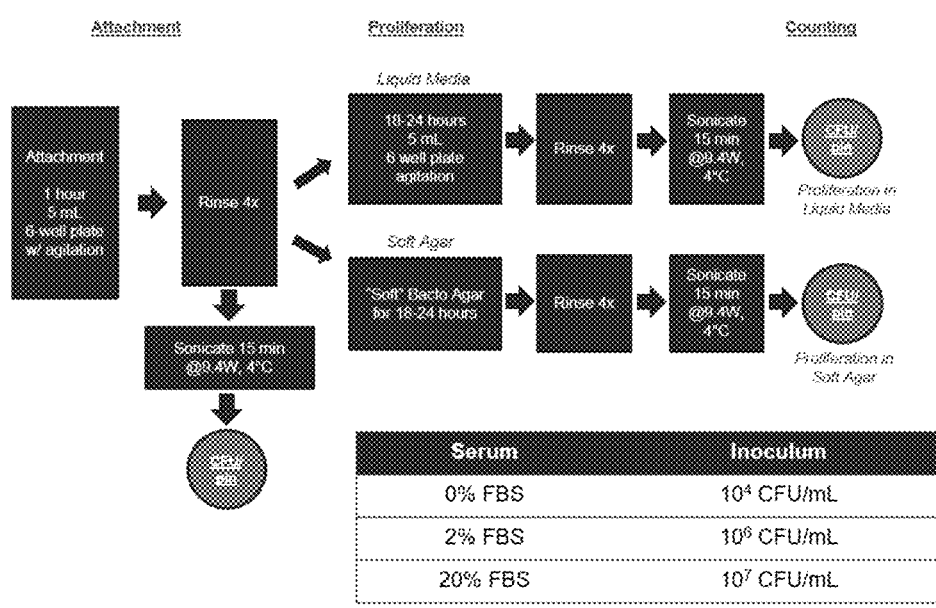
FIG. 4 provides a flowchart for performing attachment and proliferation bacterial colonization studies.

The antibacterial colonization performance of a 90 μg/cm² polylactide-coated titanium alloy (Titanium aluminum niobium) pins (4 mm diameter×30 mm long) with triclosan-vapor transfer was compared to an untreated TAN pin. Six coated TAN pins were placed into a foil pouch with 0.62-0.72 grams polyethylene compounded with 2.56% triclosan. These were placed into a preheated oven at 55° C. for 4 hours and 5 minutes to vapor transfer triclosan from the polyethylene to the polylactide-TAN pins. Attachment and proliferation bacterial colonization studies were performed as depicted in the flowchart as shown in FIG. 4 with S. aureus ATCC 25923. Fetal bovine serum was used as a component of the bacterial broth to reflect the complexity of human interstitial fluid; levels of 0, 2% and 20% were evaluated.

Table 5, below, provides the results of the assessment. The PLA-triclosan coated pin demonstrated antibacterial activity in reducing colonization at 24 hours despite not having an effect on attachment of the bacteria to the pin at 1 hour. The antibacterial effect was greater than 4-log in liquid media culture conditions while the effect in soft agar ranged from 1.4 log-reduction in the absence of serum, to 1.9 with 2% serum and 2.4-log with 20% serum. Without being limited to any particular theory, it is possible that the efficacy of triclosan in soft agar increased with serum content due to an increased ability to solubilize the triclosan and create greater tissue concentrations of the compound. Triclosan vapor transfer at 55° C. for 4 hours demonstrated antibacterial efficacy when performed on TAN pins coated with 90 μg/cm² polylactide.

TABLE 5

| | | Log10(CFU/pin) | | |
|---|---|---|---|---|
| | | TAN | PLA-triclosan | Log Reduction |
| Attachment | 0% FBS Liquid | 1.92 | 1.84 | 0.1 |
| | 2% FBS Liquid | 2.64 | 2.34 | 0.3 |
| | 20% FBS Liquid | 2.70 | 2.79 | −0.1 |
| Proliferation | 0% FBS Soft Agar | 4.52 | 3.12 | 1.4 |
| | 0% FBS Liquid | 4.50 | 0.00 | 4.5 |
| | 2% FBS Soft Agar | 4.53 | 2.65 | 1.9 |
| | 20% FBS Soft Agar | 5.37 | 2.90 | 2.5 |
| | 20% FBS Liquid | 5.29 | 0.85 | 4.4 |

Example 7—High Heat Transfer and Ultrathin Films

In further experiments, it was determined that triclosan transfer performed in all-metal containers enhances the amount of triclosan transferred to metal implants, especially where the container consists of a metal or otherwise triclosan non-absorbent materials. It is possible to use such an approach to simultaneously heat-sterilize the product and imbue antibacterial properties to the target device. As demonstrated in this example, it is particularly advantageous to combine a non-absorbent package with a preferentially absorbent coating on a metal device.

To withstand the heat required for dry heat sterilization and simultaneous triclosan vapor transfer, the polymer coating must not melt or become taky during processing such that it would stick to its container. Poly(L-lactide) or preferably poly(D-lactide) stereocomplexed with poly(L-lactide) are candidates that remain crystalline at relevant heat-sterilization temperatures. Within this example poly(L-lactide) (Lactel B6002-2 IV: 0.90-1.20) was coated onto 7-hole 3.5 LCP 316L trauma plates (DPS PN223.571 98 mm long×11 mm wide) from a 2.5% solution in chloroform at 4, 12, and 20 mm/s. Seven sample plates were coated at each speed to accommodate three samples for triclosan quantification and 1 sample each for ZOI by pour plate without PBS incubation or pre-elution at 1 hour, 24 hours, or 72 hours. After dip coating and air drying, the trauma plates were annealed at 130° C. to maximize stability of the poly(L-lactide) crystalline regions.

Triclosan transfer was achieved by depositing 1.64±0.23 mg of triclosan into each aluminum tube container by solvent casting from ethyl acetate. The target trauma plate, either coated or non-coated, was inserted, the ends of the aluminum tube were crimped closed with a pliers and vice, then triclosan transfer was completed at 130° C. for 4 hours. The samples were removed and triclosan was quantified by UV absorbance as follows:
1. 10 mg of triclosan was weighed out into a tared 10 ml volumetric flask (amber).
2. 10 mL of solvent was then added to dissolve the powder by mixing with the vortex. This was designated the first stock concentration (1000 ppm)
3. The 1000 ppm stock concentration of triclosan was used to perform subsequent dilutions with the solvents as follows:

| Triclosan (ppm) | Triclosan (uL) | Acetonitrile (uL) |
|---|---|---|
| 1 | 10 | 9990 |
| 2 | 20 | 9980 |
| 10 | 100 | 9900 |
| 20 | 200 | 9800 |
| 50 | 500 | 9500 |
| 100 | 1000 | 9000 |

4. After this, 1 mL sample of each standard was then transferred to plastic cuvettes and the absorbance of each sample was read with UV at 280 nm.
5. A standard curve for triclosan was then constructed by plotting absorbance at 280 nm vs. triclosan concentrations.

Figure 5:
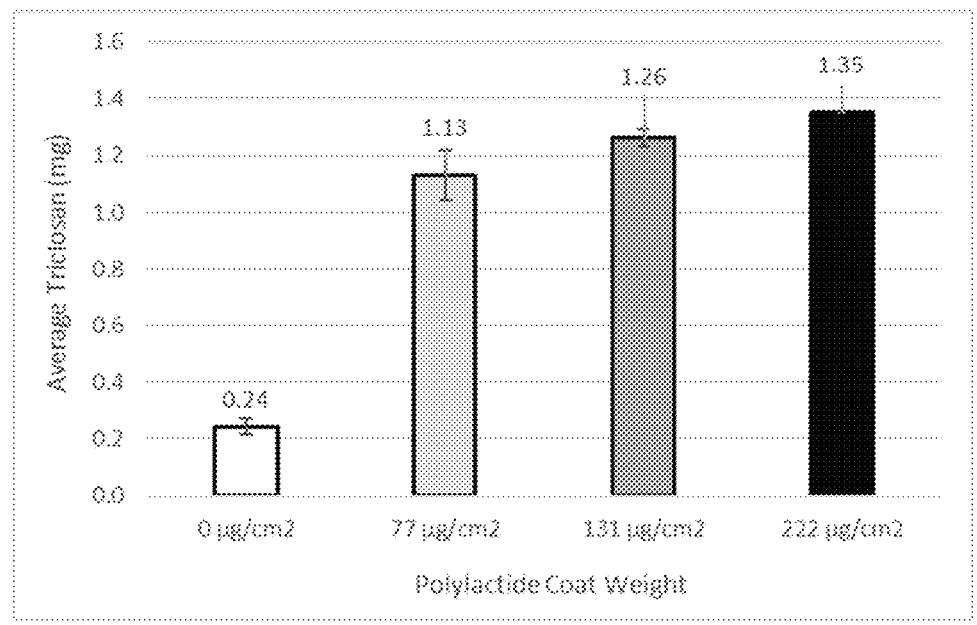
FIG. 5 illustrates the triclosan transfer to ultrathin poly (L-lactide) film-coated stainless steel locking compression plates at 130° C. in an all-metal container.

Sample Preparation
1. Plates treated with triclosan were placed in a sterile 15 mL centrifuge tubes.
2. 13 mL of acetonitrile was added to each tube. The tubes were shaken for their required time at 250 rpm.
3. After this time, the pins were transferred into a separate sterile tube. The sample solutions were stored at 4° C. until analyzed.
4. For analysis, 15 ml centrifuge tubes containing sample were vortexed briefly.
5. 1 mL of the sample was then analyzed with the UV Nanodrop instrument at 280 nm wavelength and the concentration of each sample was determined from the constructed standard curve. Samples that showed very high initial absorbance were diluted with acetonitrile FIG. 5 illustrates the triclosan transfer to ultrathin poly (L-lactide) film-coated stainless steel locking compression plates at 130° C. in an all-metal container. The degree of transfer increased 4.7-fold versus the bare metal plate with the thinnest coating, and the amount of triclosan deposited was relatively insensitive to the amount of coat weight. Table 6, below, provides the poly(L-lactide) coat weight, average triclosan transferred, and fold triclosan versus a bare metal plate with dry heat sterilization and simultaneous vapor transfer.

TABLE 6

| Coat Weight ($\mu g/cm^2$) | Avg Triclosan (mg) | Triclosan ($\mu g/cm^2$) | Fold Triclosan versus bare metal | % of initial triclosan load transferred to trauma plate |
|---|---|---|---|---|
| None | 0.24 | 9.8 | N/A | 12% |
| 77 | 1.13 | 45.7 | 4.7 | 76% |
| 131 | 1.26 | 51.0 | 5.2 | 86% |
| 222 | 1.35 | 54.7 | 5.6 | 84% |

Figure 6:
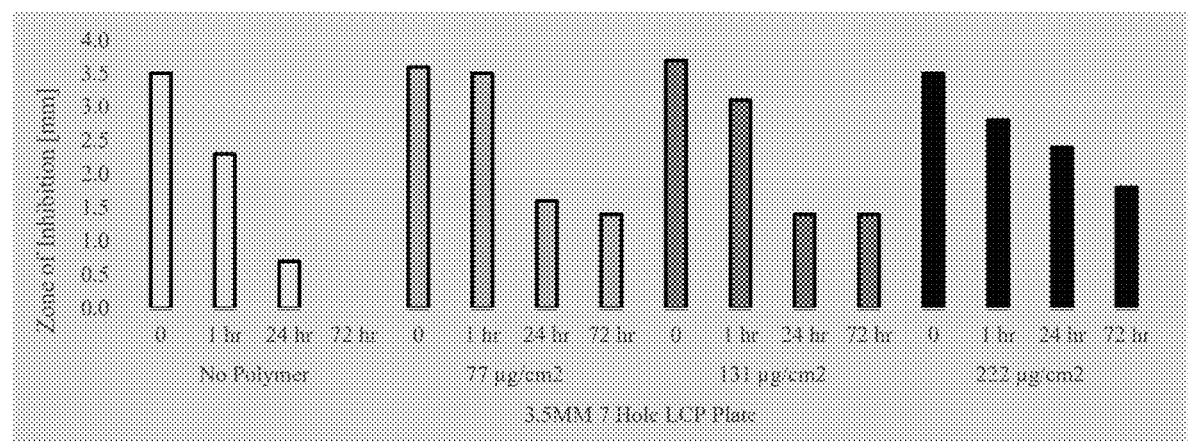
FIG. 6 shows the *S. aureus* zones resulting from 130° C. triclosan vapor transfer treated trauma plates with either bare electropolished stainless steel surfaces, or annealed ultrathin poly(L-lactide) films; samples were either immediately placed into the agar pour plate or incubated in phosphate buffered saline for 1, 24, or 72 hours.

Trauma plates were prepared with bare metal surfaces or poly(L-lactide) films of with coat weights of 77, 131, and 222 $\mu g/cm^2$. The triclosan dose on the trauma plate increased from no polymer (0.24 mg) to with polymer: 77 $\mu g/cm^2$ polymer, 4.7-fold; 131 $\mu g/cm^2$, 5.2-fold; and 222 $\mu g/cm^2$, 5.6-fold (FIG. 5). When expressing the amount of triclosan on the trauma plate as a percentage of the initial triclosan in each container, the ultrathin polymer coating increased the efficiency of transfer from 12% for an untreated plate to 76% for the 77 $\mu g/cm^2$ coated plate and 86% and 84% for the 131 $\mu g/cm^2$ and 222 $\mu g/cm^2$ ultrathin polymer coatings, respectively. Due to the high efficiency of transfer, the amount of triclosan deposited on the trauma plate was relatively insensitive to the amount of polymer on the trauma plate. This further reinforces the low cost of manufacture associated with the dip coating step, for differences in average coat weight from plate to plate would not result in large differences in triclosan dose transferred to the plate during dry heat sterilization and simultaneous vapor transfer. The uncoated trauma plate demonstrated a zone of inhibition that endured for 24 hours of pre-elution in PBS, while all three ultrathin polymer coated plates demonstrated zones of inhibition after 72 hours of pre-elution (FIG. 6).

What is claimed:
1. A system for reducing microbial infection at an orthopedic implant surgical site comprising:
an orthopedic implant body defining an outer implant surface, the orthopedic implant body further defining one or more apertures extending from the outer surface through the implant body and configured to receive a bone fastener;
a bone fastener configured to be disposed within the one or more apertures so as to secure the orthopedic implant body to a bone, the bone fastener defining an outer fastener surface;
a biodegradable polymer thin film disposed within at least one of the one or more apertures or the corresponding outer fastener surface; and,
a vaporizable antimicrobial agent disposed within the biodegradable polymer thin film,
wherein
the biodegradable polymer thin film has a surface area coat weight of about 50-250 $\mu g/cm^2$,
the vaporizable antimicrobial agent has a surface area concentration of about 5-85 $\mu g/cm^2$,
the antimicrobial agent has a surface area concentration that is sufficient to produce an effective zone of inhibition of at least 0.5 mm from a periphery of the outer implant surface,
and, a torque required for releasing the fastener from a corresponding aperture of the orthopedic implant body following use of an insertion torque that is suitable for implantation of the orthopedic implant body in a subject is not less than about 90% of a torque required for releasing an uncoated and otherwise identical fastener from a corresponding aperture of an uncoated but otherwise identical orthopedic implant body for up to 5 days following implantation of the orthopedic implant body in the subject.

2. The system according to claim 1, wherein the surface area coat weight of the biodegradable polymer thin film is about 60-230 µg/cm$^2$.

3. The system according to claim 1, wherein the biodegradable polymer thin film comprises a poly($\alpha$-hydroxy ester) polymer.

4. The system according to claim 3, wherein the biodegradable polymer thin film comprises poly(glycolic acid) (PGA), poly(lactic acid) (PLA), poly(lactic-co-glycolic acid) (PLGA), poly ($\epsilon$-caprolactone) (PCL), or any copolymer or mixture thereof.

5. The system according to claim 3, wherein the biodegradable polymer thin film comprises poly(l-lactic acid) (PLLA), poly(d-lactic acid) (PDLA), poly(d, l-lactic acid) (PDLLA), or any copolymer or mixture thereof.

6. The system according to claim 1, wherein the antimicrobial agent has a surface area concentration of about 45-55 µg/cm$^2$.

7. The system according to claim 1, wherein the vaporizable antimicrobial agent comprises a halogenated hydroxyl ether, a acyloxydiphenyl ether, or a combination thereof.

8. The system according to claim 1, wherein the vaporizable antimicrobial agent comprises 2,4,4'-trichloro-2'-hydroxydiphenyl ether (triclosan).

9. The system according to claim 1, wherein the surface area concentration of the antimicrobial agent is sufficient to produce an effective zone of inhibition of about 0.5-4 mm from a periphery of the outer implant surface.

10. The system according to claim 1, wherein the surface area concentration of the antimicrobial agent is sufficient to produce an effective zone of inhibition of about 1-2 mm from a periphery of the outer implant surface.

11. The system according to claim 1, wherein the surface area concentration of the antimicrobial agent is sufficient to produce the effective zone of inhibition up to about 6, 12, 18, 24, 36, 48, or 72 hours following implantation of the orthopedic implant body into a human subject.

12. The system according to claim 1, wherein the orthopedic implant body comprises metal, polymer, or both.

13. The system according to claim 1, wherein the body outer surface comprises metal, polymer, or both.

14. The system according to claim 1, wherein the outer implant surface comprises a polyaryletherketone (PAEK), polyalkene, a metal or metal alloy, or a combination thereof.

15. The system according to claim 1, wherein the outer implant surface comprises a metal or metal alloy.

16. The system according to claim 15, wherein the metal is titanium, stainless steel, or an alloy containing titanium or steel.

17. The system according to claim 1, wherein the outer implant surface comprises PAEK, and wherein the PAEK is polyetheretherketone (PEEK) or a copolymer thereof.

18. The system according to claim 1, wherein the outer implant surface comprises polyalkene, and wherein the polyalkene is polyethylene or a copolymer thereof.

19. A kit comprising:
at least one orthopedic implant body defining an outer implant surface, the orthopedic implant body further defining one or more apertures extending from the outer surface through the implant body and configured to receive a bone fastener;
a plurality of bone fasteners configured to be disposed within an aperture of at least one of the orthopedic implant bodies so as to secure the orthopedic implant body to a bone, each of the bone fasteners respectively defining an outer fastener surface;
a biodegradable polymer thin film disposed within at least one of the one or more apertures of each of the orthopedic implant bodies, disposed along at least a corresponding portion of the outer fastener surface of each of the bone fasteners, or both; and,
a vaporizable antimicrobial agent disposed within the biodegradable polymer thin film,
wherein
the biodegradable polymer thin film has a surface area coat weight of about 50-250 µg/cm$^2$,
the vaporizable antimicrobial agent has a surface area concentration of about 5-85 µg/cm$^2$,
the antimicrobial agent has a surface area concentration that is sufficient to produce an effective zone of inhibition of at least 0.5 mm from a periphery of the outer implant surface,
and,
a torque required for releasing one of the fasteners from a corresponding aperture of one of the orthopedic implant bodies following use of an insertion torque that is suitable for implantation of the orthopedic implant body in a subject is not less than about 90% of a torque required for releasing an uncoated and otherwise identical fastener from a corresponding aperture of an uncoated but otherwise identical orthopedic implant body for up to 5 days following implantation of the orthopedic implant body in the subject.

* * * * *